United States Patent
Kim (10) Patent No.: US 7,899,440 B2
(45) Date of Patent: Mar. 1, 2011

(54) APPARATUS FOR SECURELY TRANSMITTING/RECEIVING CONTENTS IN MOBILE COMMUNICATION NETWORK AND METHOD THEREOF

(75) Inventor: Eun-Jung Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 696 days.

(21) Appl. No.: 11/541,720

(22) Filed: Oct. 3, 2006

(65) Prior Publication Data

US 2007/0077917 A1  Apr. 5, 2007

(30) Foreign Application Priority Data

Oct. 4, 2005  (KR) ..................... 10-2005-0093134

(51) Int. Cl.
*H04M 1/66* (2006.01)
(52) U.S. Cl. ........................ 455/410; 455/411
(58) Field of Classification Search .................. 455/410, 455/411, 247, 550.1, 556.2, 466, 518; 380/247; 370/328, 349, 496, 522; 713/168; 379/189; 726/136
See application file for complete search history.

(56) References Cited

U.S. PATENT DOCUMENTS

| | | | | |
|---|---|---|---|---|
| 5,448,760 A * | 9/1995 | Frederick | ...................... | 455/410 |
| 6,343,214 B1 * | 1/2002 | Holmes | ...................... | 455/411 |
| 6,763,226 B1 * | 7/2004 | McZeal, Jr. | ...................... | 455/90.2 |
| 7,474,888 B1 * | 1/2009 | Davis et al. | ...................... | 455/411 |
| 2002/0055366 A1 * | 5/2002 | Maggenti et al. | ............. | 455/517 |
| 2003/0149891 A1 * | 8/2003 | Thomsen | ...................... | 713/201 |
| 2005/0119019 A1 | 6/2005 | Jang | | |
| 2006/0030339 A1 * | 2/2006 | Zhovnirovsky et al. | ... | 455/456.6 |
| 2006/0199598 A1 * | 9/2006 | Lee et al. | ...................... | 455/466 |

FOREIGN PATENT DOCUMENTS

| | | |
|---|---|---|
| EP | 1 255 414 A2 | 11/2002 |
| WO | WO 01/47179 A1 | 6/2001 |
| WO | WO 2004/054188 A1 | 6/2004 |

* cited by examiner

*Primary Examiner* — Charles N Appiah
*Assistant Examiner* — Stamford Hwang
(74) *Attorney, Agent, or Firm* — Birch, Stewart, Kolasch & Birch, LLP (57) ABSTRACT

A mobile terminal including a transceiver configured to transmit and receive signals to and from another mobile terminal, a security parameter module configured to set a security parameter in data to be transmitted to the another mobile terminal and to detect whether or not the security parameter is set in data received from the another mobile terminal, and a checking module configured to compare information related to the mobile terminal and the another mobile.

14 Claims, 10 Drawing Sheets

| Msg Identifier | User Data | MC Time | Priority | Privacy 0/1,2,3 | Reserved | Language | ...... |

APPARATUS FOR SECURELY TRANSMITTING/RECEIVING CONTENTS IN MOBILE COMMUNICATION NETWORK AND METHOD THEREOF

This application claims priority to Korean Application No. 10-2005-0093134 filed in Korea on Oct. 4, 2005, the entire contents of which is incorporated by reference in its entirety.

BACKGROUND OF THE INVENTION

1. Field of the Invention

The present invention relates to an apparatus and method for transmitting/receiving contents in a mobile communication network, and more particularly to an apparatus and method for securely transmitting/receiving contents using a message service provided by the network.

2. Description of the Related Art

Since the introduction of second generation communication technologies, many service providers provide the user with a variety of communication services such a short message service (SMS), audio data, moving images, electronic-mail, etc. The SMS allows the user to transmit and receive messages having a relatively short length via the mobile communication network.

Figure 1:
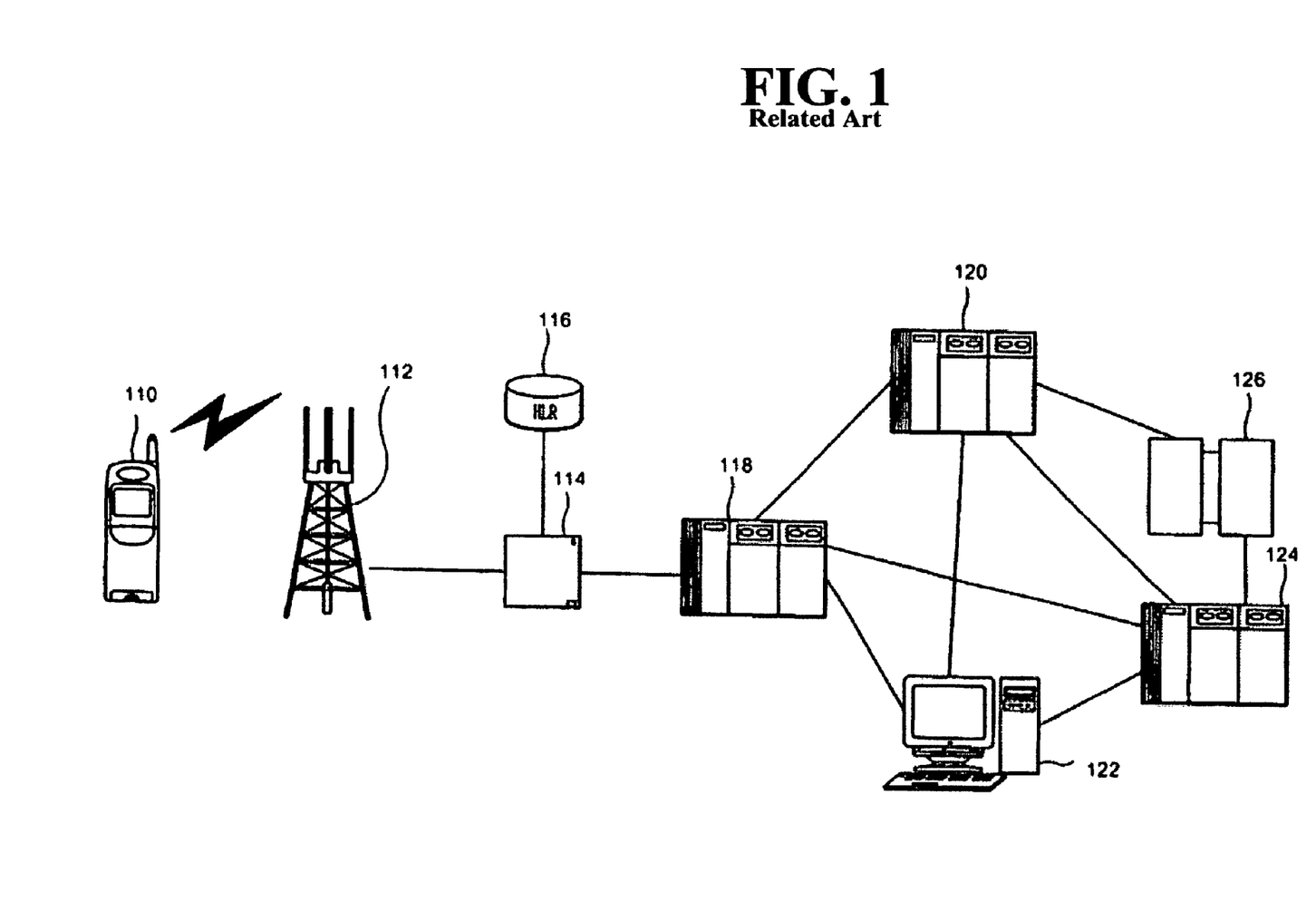
FIG. 1 is an overview showing an SMS system in accordance with the related art.

In more detail, FIG. 1 is an overview of an SMS system in accordance with the related art. As shown, the related art SMS system includes a mobile station (MS) 110, a base station transceiver system (BTS) 112, a base station controller (BSC)/mobile switching center (MSC) 114, a home location register (HLR) 116, an SMS message center (SMC) 118, an SMS server 120, an operating management center (OMC) 122, a cell broadcasting center (CBS) 124, and an information provider (IP) 126 for cell broadcasting (CB).

Figure 2:
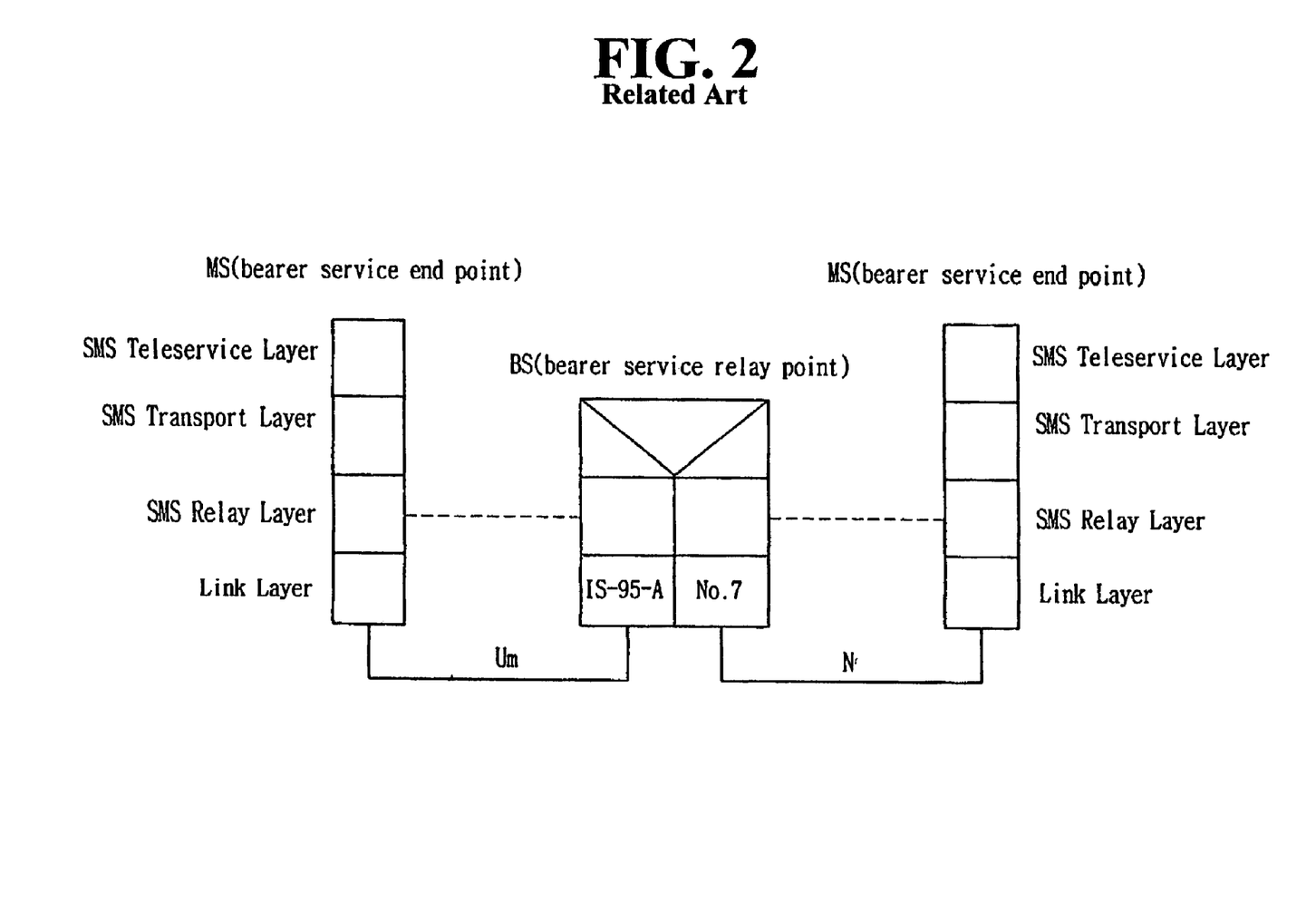
FIG. 2 is an overview showing a stack of an SMS protocol in accordance with the related art.

Turning next to FIG. 2, which illustrates a stack of an SMS protocol in accordance with the related art. As shown, the SMS protocol includes a link layer, a relay layer, a transport layer, and a tele-service layer. Hereinafter, only the upper two layers among the four layers, which are used to transmit a text message, will be explained.

Figure 3:
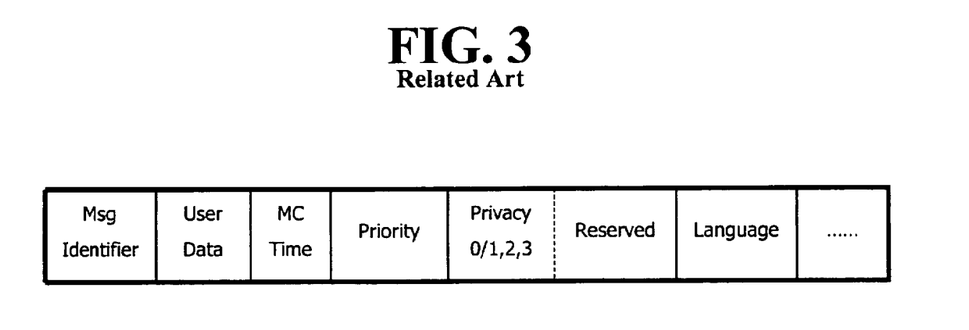
FIG. 3 is an overview of a tele-service layer of the SMS protocol in accordance with the related art.

In more detail, the transport layer forms a message by receiving bearer data from the tele-service layer in a mobile communication terminal. As shown in FIG. 3, the related art tele-service layer includes a plurality of sub-parameters, which are used by the tele-service layer to support a basic SMS function.

That is, FIG. 3 illustrates the tele-service layer including a message identifier, user data, an MC time stamp, a priority indicator, a privacy indicator, and a language indicator. The message identifier identifies five types of messages: an SMS deliver message, an SMS submit message, an SMS cancellation message, an SMS user acknowledge message, and an SMS delivery acknowledge message. Further, the user data sub-parameter includes the data input by the user, and the MC time stamp sub-parameter indicates a time at which the message was transmitted. The priority indicator sub-parameter indicates a message priority.

Further, as shown in FIG. 3, the privacy indicator sub-parameter includes four different priority levels (i.e., levels 0, 1, 2, 3). Thus, the user may set different privacy levels to hide their phone number from being displayed on the receiving terminal or to prevent the user receiving the message from forwarding the message to another user. In the related art, a privacy level of "0" indicates no privacy function, a privacy level of "1" indicates the transmitter's phone number is not shown at a receiving side, and a privacy level of "2" indicates the transmitted message should not be forwarded to another user. The priority level of "3" is not used. Further, the privacy indicator sub-parameter also includes a reserved field, and the language indicator sub-parameter indicates a language used to compose the message.

In addition, in the related art, when the privacy sub-parameter is set to a priority level of "1" such that the transmitter's phone number is not displayed on the receiving terminal, the receiving terminal performs NULL processing of the transmitter's phone number when the receiver's contents are decoded. Further, by setting the privacy level of "2", the user can protect important contents which must not be forwarded. Thus, pay-per-view contents provided from a contents provider can be prevented from being forwarded to another user (e.g., pay-per-view contents downloaded by accessing a particular web page).

However, in the related art, the privacy features are limited to the above-noted functions. The related art does not address situations where data containing important or sensitive contents (e.g., residence information, credit card information, an ID or password, etc.) may be transmitted to an unintended receiver. That is, if a user accidentally inputs a wrong destination telephone number when transmitting information, the sensitive information is transmitted to the unintended destination terminal.

The related art also does not address the situation in that someone can transmit "spam" contents or immoral contents to a user's terminal, while hiding his or her phone number. Further, if the user's terminal was stolen, sensitive contents may be transmitted by the unauthorized user to an unintended receiver.

SUMMARY OF THE INVENTION

Accordingly, one object of the present invention is to address the above-noted and other problems.

Another object of the present invention is to provide an apparatus and method for securely transmitting/receiving contents in a mobile communication network.

To achieve these and other advantages and in accordance with the purpose of the present invention, as embodied and broadly described herein, the present invention provides in one aspect, a mobile terminal including a transceiver configured to transmit and receive signals to and from another mobile terminal, a security parameter module configured to set a security parameter in data to be transmitted to the another mobile terminal and to detect whether or not the security parameter is set in data received from the another mobile terminal, and a checking module configured to compare information related to the mobile terminal and the another mobile.

In another aspect, the present invention provides a mobile terminal method including transmitting and receiving, via a first mobile terminal, signals to and from a second mobile terminal, setting a security parameter in data to be transmitted to the second mobile terminal and detecting whether or not the security parameter is set in data received from the second mobile terminal, and comparing information related to the first mobile terminal and the second mobile.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

Reference will now be made in detail to the preferred embodiments of the present invention, examples of which are illustrated in the accompanying drawings.

1. First Embodiment

The first embodiment of the present invention relates to a method and a mobile communication terminal for securely transmitting/receiving contents.

Figure 4:
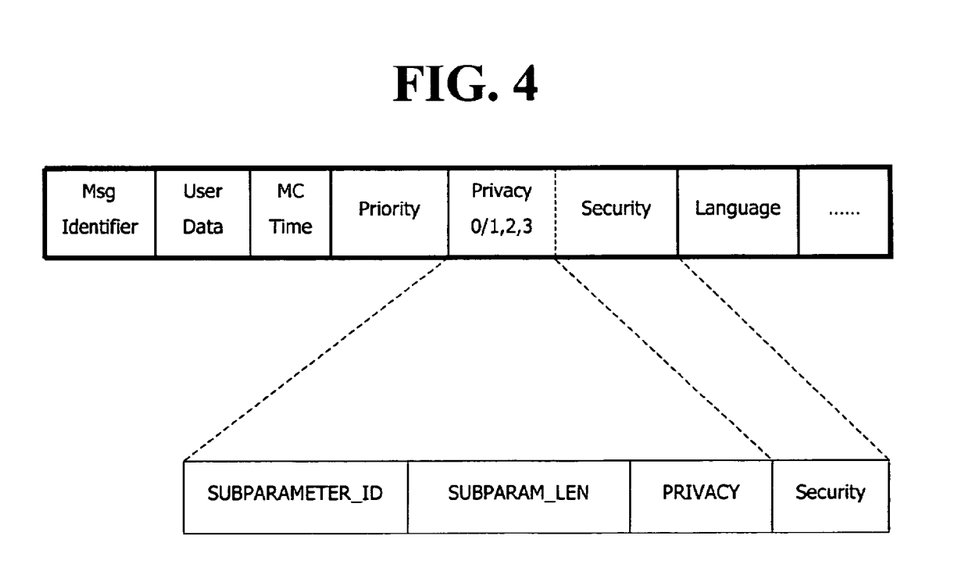
FIG. 4 is an overview of a tele-service layer and an enlarged view in accordance with an embodiment of the present invention.

In more detail, FIG. 4 is an overview of a tele-service layer in accordance with an embodiment of the present invention. As shown, the reserved fields of the privacy indicator sub-parameter is used as an additional security parameter. Thus, the present invention is advantageously able to use the existing parameters of the tele-service layer without modifying the structure of the layer. Further, the receiving terminal determines whether or not the security parameter has been set, and receives data in accordance with the determined result.

In more detail, and as shown in FIG. 4, the privacy indicator includes a sub-parameter_ID of 8 bits, a sub-parameter_length of 8 bits, a privacy parameter of 2 bits, and a reserved parameter of 6 bits. In the present invention, the reserved 6 bits are used as an additional security parameter. Accordingly, a security option in accordance with the present invention can be set to be turned on or off. For example, when the reserved bits are partially set (e.g. one bit or more than one bit) as a security parameter, a security option in accordance with the present invention can be turned on or off, and the remaining bits can be reserved for another purpose. On the contrary, when the reserved bits are entirely set as a security parameter, a security option and an error checking function for checking an error generated when data is transmitted or received can be set to be turned on or off.

When the reserved bits are partially set as a security parameter, the remaining bits of the reserved bits can be set as a security level control parameter or can be reset for an additional option. Also, when the reserved bits are entirely set as a security parameter, some bits of the security parameter can be set as a security level control parameter or can be reset for an additional option. Accordingly, a receiving side terminal can determine whether or not the remaining partial reserved bits or some parts of the entire reserved bits have been set as a security level control parameter or have been set for an additional option.

Based on this determination, if a security level control parameter or an additional option parameter has been set, a security level can be controlled in accordance with the received security level or a predetermined specific step can be activated on the receiving terminal. The security level is used to control whether or not various functions on the receiving terminal are to be performed or to lock a particular feature on the receiving side terminal (e.g., locking input keys, locking or preventing message certifying, locking a transmission or receiving function; etc.).

Figure 5:
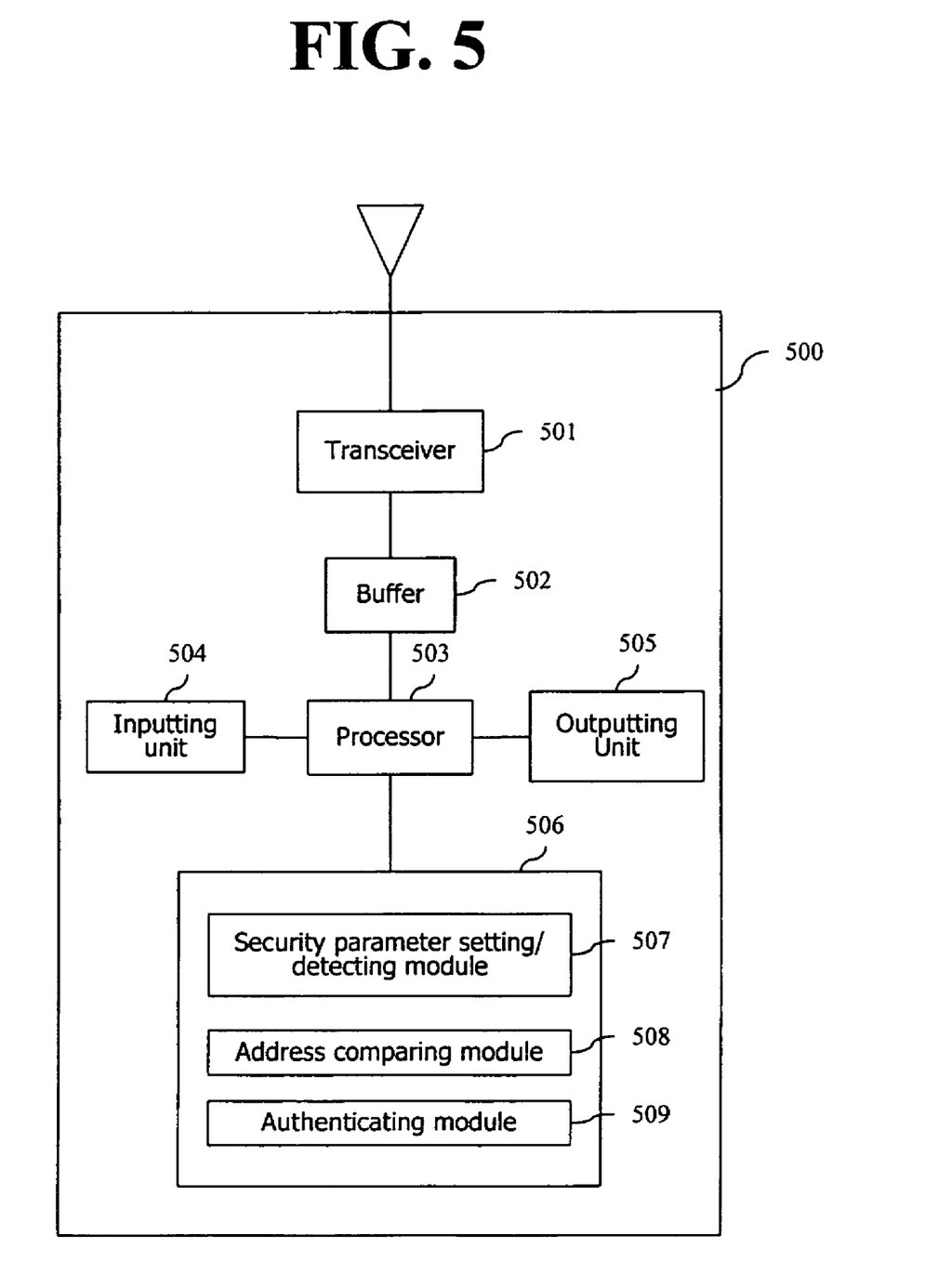
FIG. 5 is an overview showing a mobile communication terminal for securely transmitting/receiving contents in accordance with an embodiment of the present invention.

Turning now to FIG. 5, which is an overview of a mobile communication terminal for securely transmitting/receiving contents in accordance with an embodiment of the present invention. As shown, the mobile communication terminal 500 includes a transceiver 501, a buffer 502, a processor 503, an inputting unit 504, an outputting unit 505 and a storing unit 506. The storing unit 506 includes a security parameter setting/detecting module 507, an address comparing module 508 and an authenticating module 509. The security parameter setting/detecting module 507 sets the security parameter in transmitted data or determines whether or not the security parameter has been set in received data.

Further, when the security option is turned on in a transmitting mobile terminal, the address comparing module 508 determines whether or not the recipient's address is stored in the transmitter's address list prior to transmitting data. If the recipient's address is stored in the transmitter's address list, the address comparing module 508 normally transmits data. However, if the recipient's address is not stored in the transmitter's address list, the address comparing module 508 notifies the user in a visual, audible, and/or tactile manner (e.g., using light emitters, audio speakers, display screen, vibration mode, etc.).

In addition, when a receiving mobile terminal receives data in which a security parameter has been set, the address comparing module 508 on the receiving terminal determines whether or not the transmitter's address is stored in an address list of the receiving terminals. If the transmitter's address is stored in the receiving terminal's address list, the module 508 receives the data normally. Otherwise, the module 508 notifies the user of the receiving terminal the data will not be received.

In addition, the authenticating module 509 performs an authentication function such that data is normally received only when an authentication has been satisfied. If an authentication has not been satisfied, the authenticating module 509 informs the user in a visual, audible, and/or tactile manner. The detecting module 507, comparing module 508 and authenticating module 509 may be a software program (e.g., computer code) that is executed by the processor 503.

Figure 6:
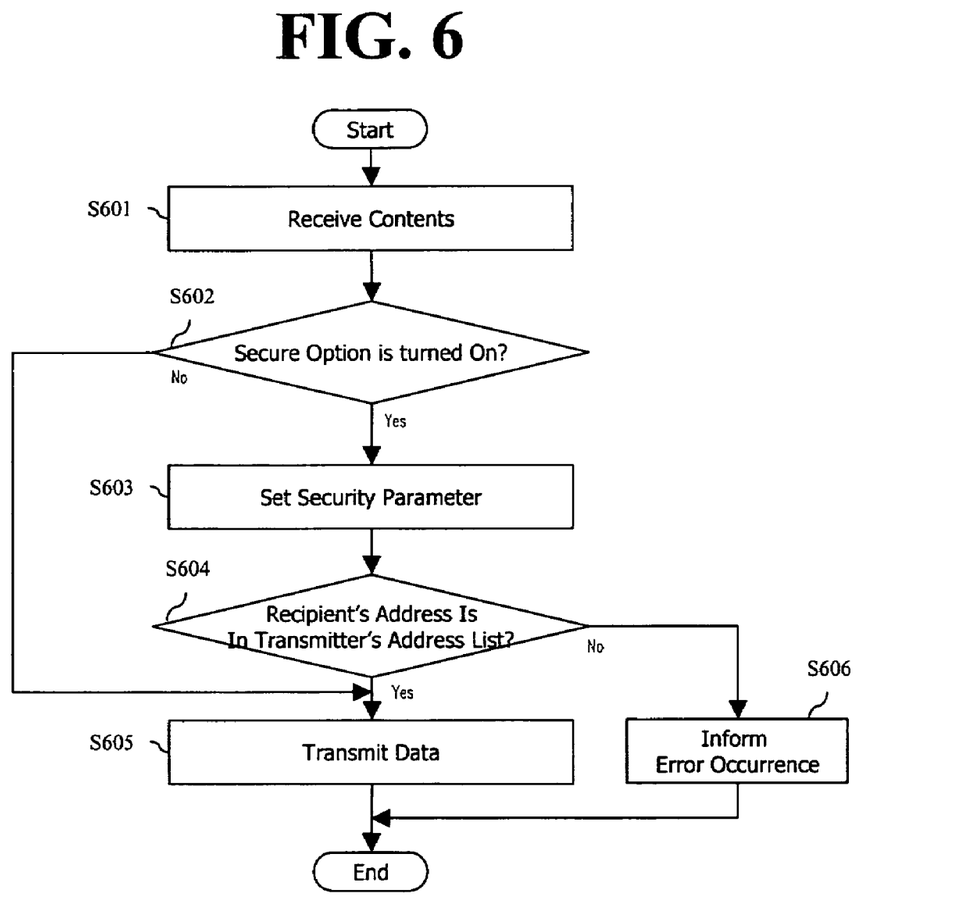
FIG. 6 is a flowchart showing a method for securely transmitting contents in accordance with an embodiment of the present invention.

Turning next to FIG. 6, which is a flowchart showing a method for securely transmitting contents in accordance with an embodiment of the present invention. FIG. 5 will also be referred to in this description. Note that FIG. 6 relates to a security process performed on the transmitting terminal, and FIG. 7, which will be discussed after FIG. 6, refers to a security process performed on the receiving terminal.

As shown in FIG. 6, the user inputs the contents or data to be transmitted (S601), and the detecting module 507 on the transmitting terminal determines if the security option has been turned on (S602). The implementation order of the steps S601 and S602 may also be reversed. Note, the security option can be set by the user (e.g., by prompting the user to turn on or off the security feature).

If the security option has not been turned on (NO in S602), the data is normally transmitted (S605). On the contrary, if the security option has been turned on (YES in S602), the security parameter in the tele-service layer (FIG. 4) is set (S603). The address comparing module 508 then determines whether or not the recipient's address is stored in the transmitter's address list (S604). If the recipient's address is stored in the transmitter's address list (YES in S604), the data is normally transmitted (S605). On the contrary, if the recipient's address is not stored in the transmitter's address list (NO in S604), the user of the transmitting terminal is appropriately notified about the error (S606). In addition, instead of this error notification, the security level control parameter can be set to increase the security level or a process pre-set at the receiving side can be performed. Therefore, in accordance with the method shown in FIG. 6, important or sensitive data is prevented from being transmitted to an unintended receiver.

Figure 7:
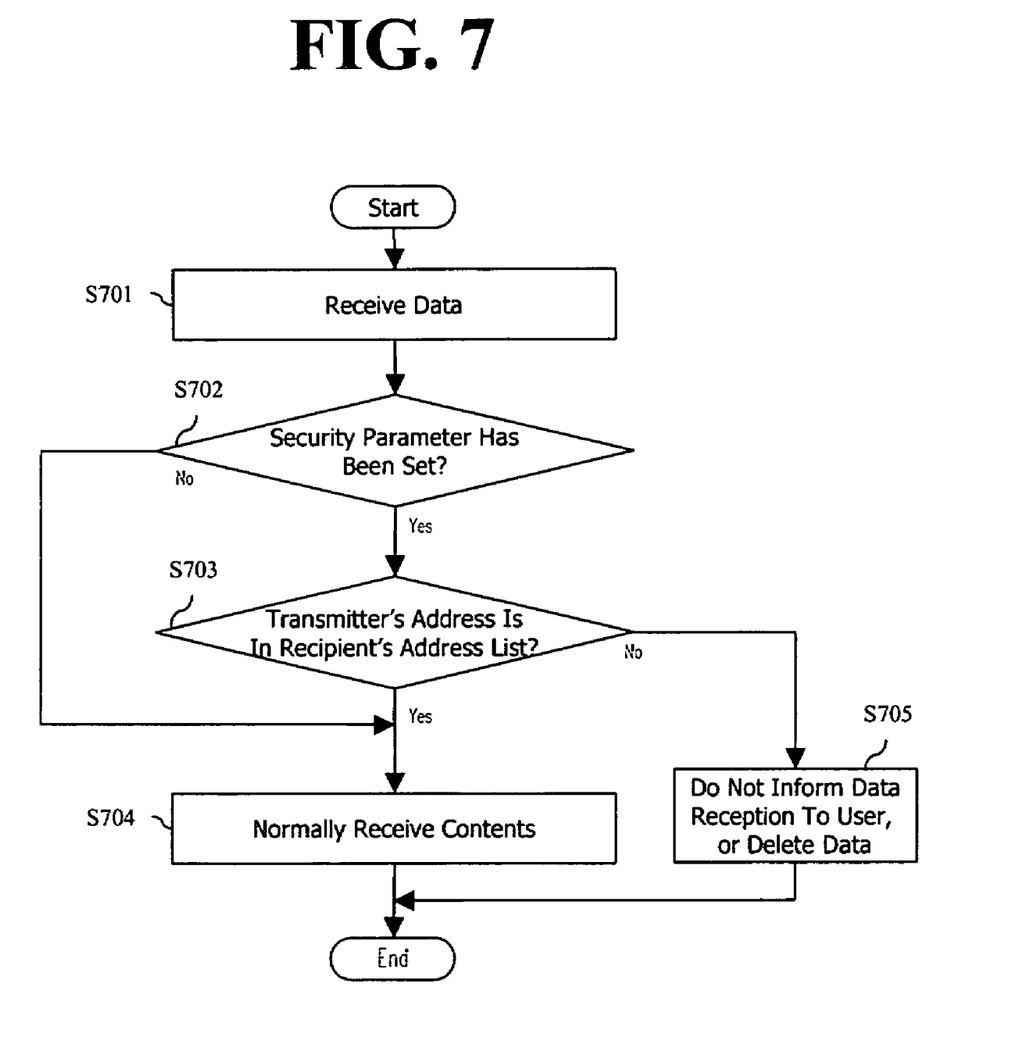
FIG. 7 is a flowchart showing a method for securely receiving contents in accordance with an embodiment of the present invention.

Turning next to FIG. 7, which is a flowchart showing a method for securely receiving contents in accordance with an embodiment of the present invention. FIG. 5 will also be referred to in this description. As shown in FIG. 7, the data is received (S701), and the detecting module 507 on the receiving terminal determines whether or not the security parameter has been set (S702). If the security parameter has not been set (NO in S702), the data is normally received (S704). On the contrary, if the security parameter has been set (YES in S702), the comparing module 508 determines whether or not the transmitter's address is stored in the recipient's address list (S703).

If the transmitter's address is stored in the recipient's address list (YES in S703), the data is normally received (S704). On the contrary, if the transmitter's address is not stored in the recipient's address list (NO in S703), the receiving user is not informed about the data reception and/or the data is deleted (S705). Alternatively, if the transmitter's address is not stored in the recipient's address list in step S703, the security level of the receiving mobile terminal may be increased or a step that was pre-set in the receiving mobile terminal can be performed.

Figure 8:
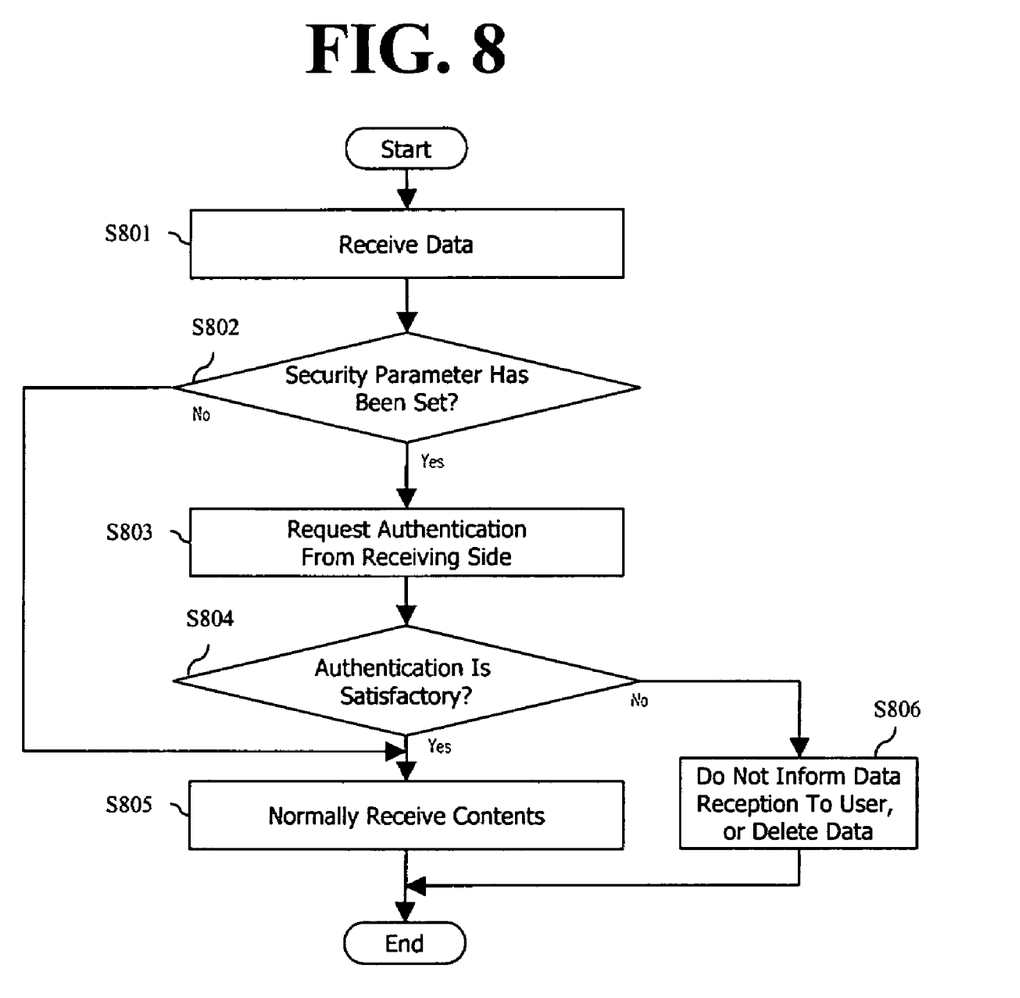
FIG. 8 is a flowchart showing a method for securely receiving contents in accordance with another embodiment of the present invention.

Next, FIG. 8 is a flowchart showing a method for securely receiving contents in accordance with another embodiment of the present invention. FIG. 5 will also be referred to in this description. As shown in FIG. 8, the data is received (S801), and the detecting module 507 determines whether or not a security parameter has been set (S802). If the security parameter has not been set (NO in S802), the data is normally received (S805). On the contrary, if the security parameter has been set (YES in S802), the authentication module 509 on the receiving terminal performs an authentication process (S803).

The authentication process includes, for example, prompting the user of the receiving terminal to determine whether he or she wants to receive the data. If the authentication process has been satisfied (YES in S804), the data is normally received (S805). On the contrary, if the authentication process has not been satisfied (NO in S804), the user is notified about the error (S806).

In step S801, the actual data does have to be entirely received, but pilot data (i.e., test data) for certifying whether or not the authentication has been satisfied in the receiving side can be used. Further, in step S803, if a specific server has to be accessed to perform the authentication process, the receiving terminal can directly access the server. In addition, if a specific code preset by a transmitting side or a receiving side has to be input for the authentication process, a personal key/public key based-authentication process can be used. Thus, the authorization process prevents an unauthorized person from gaining access to sensitive data.

Further, rather than using a particular security level, the receiving terminal may be configured to recognize contents including specific information, and then delete the received data and not notify the user. An authorization process may also be activated for sensitive contents. Thus, the receiving terminal may be configured to recognize spam contents, and prevent the spam information from being shown to the user of the receiving terminal.

Further, the above-mentioned setting, comparing, or detecting modules can be selectively enabled or disabled. In addition, a security level can be adjusted by controlling a security option by the transmitting or receiving terminal. The aforementioned processes may also be selectively activated each time data is input or may be activated for all data input. Also, the setting, comparing, and the detecting processes can be selectively activated for a particular group of addresses or set for each address in an address list. In addition, when important or sensitive information such as residence registration number, credit card information, an ID or password, etc. is included in contents to be transmitted or received, the setting, comparing, and detecting processes can be set to be automatically turned on upon detection that the contents are important or sensitive.

2. Second Embodiment

Figure 9:
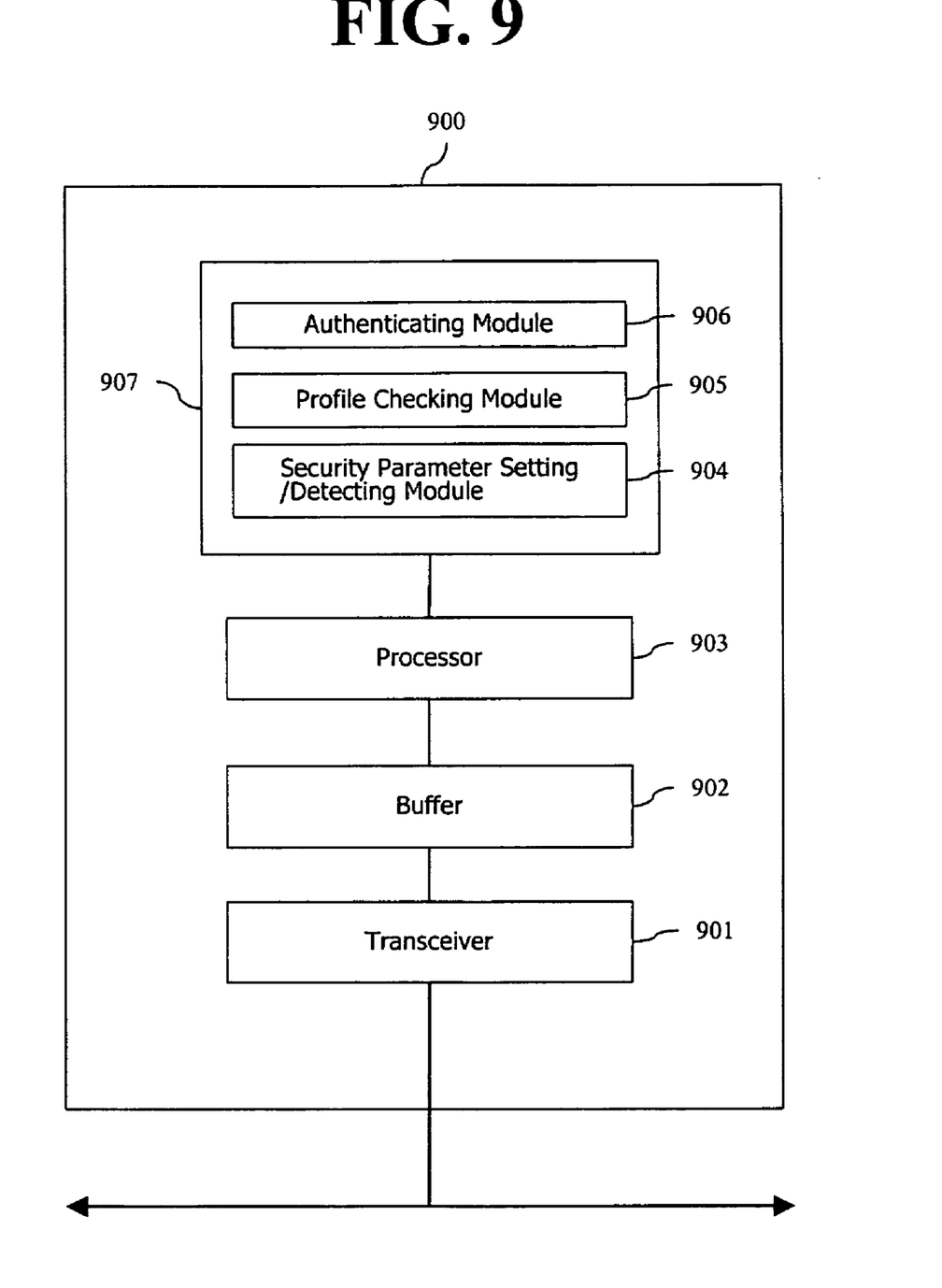
FIG. 9 is an overview showing a contents relaying apparatus in accordance with an embodiment of the present invention.

Turning now to FIG. 9, which is an overview of a contents relaying apparatus in accordance with another embodiment of the present invention for securely transmitting and receiving contents. In this embodiment, the relaying apparatus 900 include a storage unit 907 containing a security parameter setting/detecting module 904, a profile checking module 905 and an authenticating module 906. Further, the content relaying apparatus 900 also includes a transceiver 901, a buffer 902 and a processor 903.

In addition, similar to the first embodiment, the detecting module 904 detects a security parameter to determine whether or not data should be relayed. Thus, the data is relayed to a receiving terminal based on whether or not the security parameter has been set. The security parameter setting/detecting module 904 can also set the security parameter.

Further, the profile checking module 905 refers to a profile including transmission/reception security information input by the user. In addition, when a security parameter is not set, the profile checking module 905 checks a profile set by the user to determine if the security parameter setting/detecting module 904 should set the security parameter. In addition, the authenticating module 906 requests authentication from the receiving side. In this instance, the data is relayed to the receiving terminal only when the authentication is successful.

Figure 10:
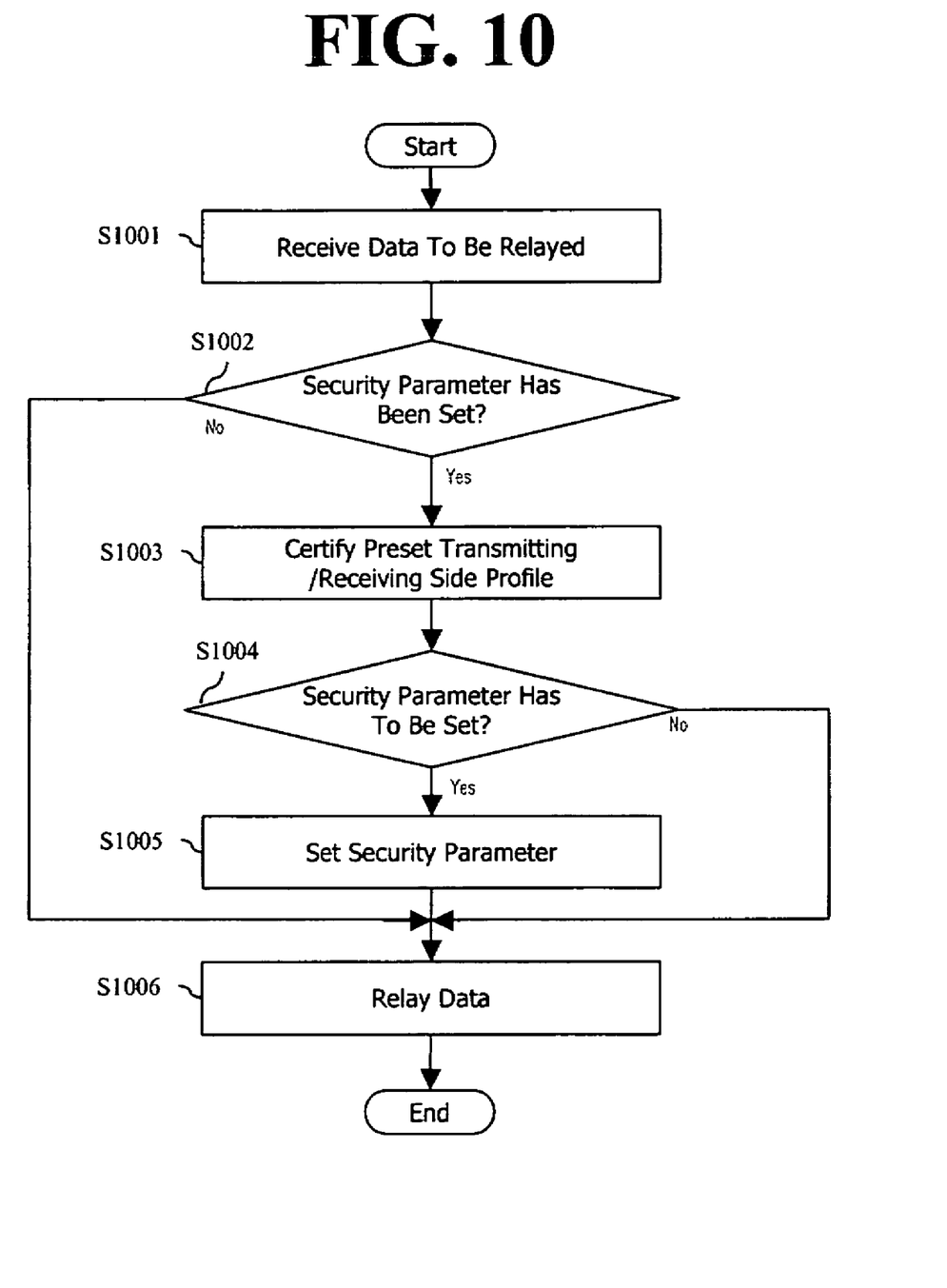
FIG. 10 is a flowchart showing a method for relaying contents in accordance with an embodiment of the present invention.

Turning now to FIG. 10, which is a flowchart illustrating a method for relaying contents in accordance with an embodiment of the present invention. FIG. 9 will also be referred to in this description. As shown in FIG. 10, the data to be relayed is first received (S1001), and then the detecting module 904 detects whether or not the security parameter has been set (S1002). If the security parameter has not been set (NO in S1002), the profile checking module 905 certifies a preset transmitting/receiving side profile (S1003). Then, in step S1004, the profile checking module 905 determines whether or not a security parameter should be set based on the certified profile. If the checking module 905 determines the security parameter should be set (YES in step S1004), the parameter is set (S1005). Alternatively (NO in step S1004), the security parameter is not set. The data is then relayed (S1006).

Accordingly, the service provider receives an instruction for setting a security option from the transmitting/receiving side to relay a service in accordance with the set security option, which is useful in minimizing or effectively preventing spam contents.

Figure 11:
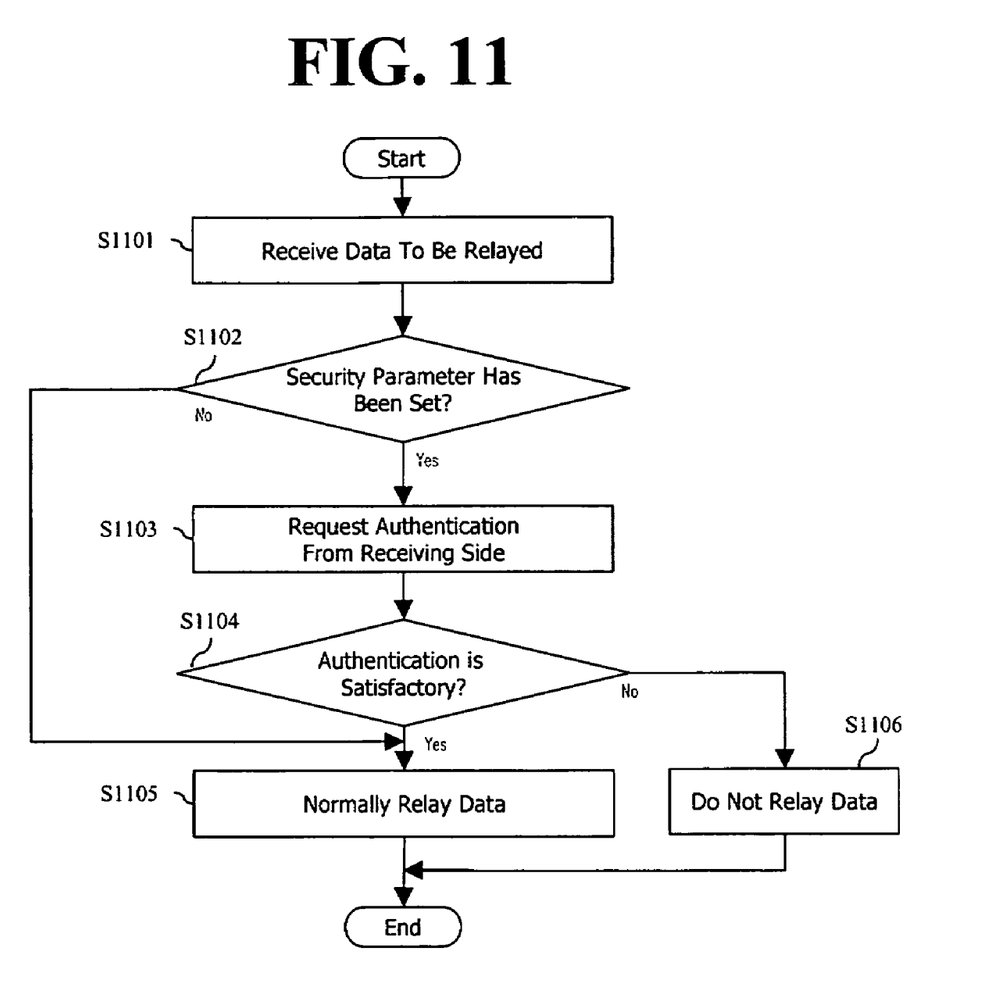
FIG. 11 is a flowchart showing a method for relaying contents in accordance with another embodiment of the present invention.

Turning now to FIG. 11, which is a flowchart showing a method for relaying contents in accordance with another embodiment of the present invention. FIG. 9 will also be referred to in this description. As shown, the data to be relayed is first received (S101), and then the detecting module 904 determines whether or not a security parameter has been set (S1102). If the security parameter has been set, the authentication module 906 requests an authentication from the receiving side (S1103), and determines whether or not the authentication has been satisfied (S1104). If the authentication has been satisfied (YES in S1104), the data is relayed (S1105). However, if the authentication has not been satisfied (NO in S1104), the data is not relayed (S1106).

In the relaying method in accordance with this embodiment, the transmitting side pre-sets a code to be input by the receiving side. In step S1103, the code preset by the transmitting side is requested to be input by the receiving side, or a personal key/public key based-authentication process can be performed. Accordingly, only the receiving side that knows the code by communicating with the transmitting side can normally receive the data transmitted from the transmitting side. Therefore, when a mobile communication terminal is not in the possession of its rightful owner, important contents or privacy contents can be effectively protected.

Further, as noted above, the mobile communication terminal includes a transceiver to transmit and receive data, a memory to store contact information of the sender and receiver, and a security module to process a security parameter. The terminal also includes a processor cooperating with the transceiver, the memory, and the security module to operate in a transmission mode or in reception mode.

Thus, in the transmission mode, the security module sets a security parameter in data to be transmitted, the processor checks whether the contact information of the recipient is stored in the memory, and data is transmitted in a secure manner via the messaging service through the transceiver according to the set security parameter and the contact information of the recipient. Further, in the reception mode, the security module detects whether a security parameter exists in the received data, the processor checks whether the contact information of the sender is stored in the memory, and data is received in a secure manner via the messaging service through the transceiver according to the detected security parameter and the contact information of the sender.

In addition, the present invention is not limited to the SMS. That is, the present invention can be applied to audio data, video data, moving images, etc. transmitted by an SMS protocol, or can be applied to a Multimedia Messaging Service (MMS). Furthermore, the present invention can be applied to an enhanced messaging service (EMS), a voice mail system (VMS), a unified messaging service (UMS), etc., as well as any other techniques and technologies where the protection of important or sensitive contents is an issue.

As aforementioned, in the present invention, contents including important information or privacy information is effectively prevented from being transmitted to an unintended recipient, and spam contents can be blocked. Also, in case that a mobile communication terminal is not in the possession of its true owner, received contents is effectively prevented from being transmitted to an unintended person. Also, private contents between couples or friends, etc. or spam contents can be minimized or effectively prevented from being transmitted or received.

The above methods of the present invention can be implemented by software, by hardware, or by any combination thereof. For instance, the present invention can be implemented by codes or commands within a software program stored in a storage unit such as an inner memory, a flash memory, a hard disc indicated a mobile communication terminal, etc. and executed by a processor within the mobile communication terminal. The above noted modules can also be software modules.

This invention may be conveniently implemented using a conventional general purpose digital computer or microprocessor programmed according to the teachings of the present specification, as will be apparent to those skilled in the computer art. Appropriate software coding can readily be prepared by skilled programmers based on the teachings of the present disclosure, as will be apparent to those skilled in the software art. The invention may also be implemented by the preparation of application specific integrated circuits whereby interconnecting an appropriate network of conventional computer circuits, as will be readily apparent to those skilled in the art.

Any portion of the present invention implemented on a general purpose digital computer or microprocessor includes a computer program product which is a storage medium including instructions which can be used to program a computer to perform a process of the invention. The storage medium can include, but is not limited to, any type of disk including floppy disk, optical disk, CD-ROMs, and magneto-optical disks, ROMs, RAMs, EPROMs, EEPROMs, magnetic or optical cards, or any type of media suitable for storing electronic instructions.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

What is claimed is:

1. A mobile terminal, comprising:
    a transceiver configured to transmit and receive signals to and from at least one other mobile terminal;
    an input unit configured to input an address of said at least one other mobile terminal and to input a message to be transmitted to said at least one other mobile terminal;
    a security parameter module included on the mobile terminal and configured to set a security option when predetermined information is included in the message and to set a security parameter in data of the message to be transmitted to said at least one other mobile terminal; and a checking module included on the mobile terminal and configured to check whether or not an address of the at least one other mobile terminal, which transmits the signals to the mobile terminal, is included in an address list of the mobile terminal that receives the signals when the security option is turned on, wherein when the mobile terminal transmits the data to said at least one other mobile terminal, the security parameter module determines whether or not the security option is turned on, and sets the security parameter in the data to be transmitted when the security option is on and does not set the security parameter in the data to be transmitted when the security option is not on, and wherein after the security parameter module determines the security option is on, the checking module included on the mobile terminal prevents the message from being transmitted to said at least one other mobile terminal when the input address of the at least one other mobile terminal is not included in the address list of the mobile terminal.

2. The mobile terminal of claim 1, wherein the predetermined information includes a residence, a registration number, credit card information or a password.

3. The mobile terminal of claim 1, wherein when the checking module determines the input address of the at least one other mobile terminal is included in the address list of the mobile terminal, the data is transmitted to the at least one other mobile terminal.

4. The mobile terminal of claim 1, further comprising:
an authentication module configured to request authentication from the mobile terminal or the at least one other mobile terminal.

5. The mobile terminal of claim 4, wherein when the mobile terminal receives data from the at least one other mobile terminal and the security parameter module detects the security parameter is set in the received data, the authentication module requests authentication from the mobile terminal that it is ok to receive the data.

6. The mobile terminal of claim 4, wherein when the mobile terminal transmits data to the at least one other mobile terminal and the security parameter module detects the security parameter is set in the data to be transmitted, the authentication module requests authentication from the at least one other mobile terminal that it is ok to transmit the data to the at least one other mobile terminal.

7. The mobile terminal of claim 1, wherein when the mobile terminal transmits data to the at least one other mobile terminal and the security parameter module determines the security parameter in the data to be transmitted is not set, the checking module certifies profiles of the at least one other mobile terminal and the mobile terminal to determine if the security parameter should be set.

8. The mobile terminal of claim 4, further comprising:
a control processor configured to control the transceiver, the security parameter module, the checking module and the authenticating module.

9. A method of controlling a mobile terminal, the method comprising:
inputting, via an input unit included on the mobile terminal, an address of at least one other mobile terminal and a message to be transmitted to said at least one other mobile terminal;
setting, via a security parameter module included on the mobile terminal, a security option when predetermined information is included in the message;
setting, via the security parameter module, a security parameter in data of the message to be transmitted to said at least one other mobile terminal;
checking, via a checking module included on the mobile terminal, whether or not an address of the at least one other mobile terminal, which transmits signals to the mobile terminal, is included in an address list of the mobile terminal, which receives the signals when the security option is turned on;
when the mobile terminal transmits the data of the message to said at least one other mobile terminal, determining whether or not the security option is turned on, and setting the security parameter in the data to be transmitted when the security option is on and not setting the security parameter in the data to be transmitted when the security option is not on; and
when the security option is on, preventing the message from being transmitted to said at least one other mobile terminal when the input address of the at least one other mobile terminal is not included in the address list of the mobile terminal.

10. The mobile terminal method of claim 9, wherein the predetermined information includes a residence, a registration number, credit card information or a password.

11. The mobile terminal method of claim 9, wherein when the comparing step determines the input address of the at least one other mobile terminal is included in the address list of the mobile terminal, the data is transmitted to the at least one other mobile terminal.

12. The mobile terminal method of claim 9, further comprising:
requesting authentication from the either the mobile terminal or the at least one other mobile terminal.

13. The mobile terminal method of claim 12, wherein when the mobile terminal transmits data to the at least one other mobile terminal and the detecting step detects the security parameter is set in the data to be transmitted, the requesting step requests authentication from the at least one other mobile terminal that it is ok to transmit the data to the at least one other mobile terminal.

14. The mobile terminal method of claim 9, wherein when the mobile terminal transmits data to the at least one other mobile terminal and the detecting step determines the security parameter in the data to be transmitted is not set, the comparing step certifies profiles of the mobile terminal and the at least one other mobile terminal to determine if the security parameter should be set.

* * * * *